United States Patent
Kuroda

(10) Patent No.: US 9,898,233 B2
(45) Date of Patent: Feb. 20, 2018

(54) IMAGE FORMING APPARATUS THAT CANCELS JOB UPON OCCURRENCE OF ERROR, AND CONTROL METHOD THEREFOR

(71) Applicant: CANON KABUSHIKI KAISHA, Tokyo (JP)

(72) Inventor: Takashi Kuroda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/270,304

(22) Filed: Sep. 20, 2016

(65) Prior Publication Data

US 2017/0097798 A1  Apr. 6, 2017

(30) Foreign Application Priority Data

Oct. 2, 2015 (JP) ................. 2015-196781

(51) Int. Cl.
*G06F 3/12* (2006.01)
*H04N 1/00* (2006.01)

(52) U.S. Cl.
CPC .......... *G06F 3/1235* (2013.01); *G06F 3/1204* (2013.01); *G06F 3/1222* (2013.01); *G06F 3/1258* (2013.01); *H04N 1/00206* (2013.01); *H04N 2201/0094* (2013.01)

(58) Field of Classification Search
CPC ........................... G06F 3/1235; G06F 3/1204
See application file for complete search history.

(56) References Cited

U.S. PATENT DOCUMENTS

| | | | |
|---|---|---|---|
| 2010/0097654 A1* | 4/2010 | Takei | G06F 3/1257 358/1.16 |
| 2010/0218093 A1* | 8/2010 | Sakamoto | H04N 1/0044 715/274 |
| 2012/0062915 A1* | 3/2012 | Hirama | G06K 15/1823 358/1.9 |

FOREIGN PATENT DOCUMENTS

JP  4584731 B2  11/2010

\* cited by examiner

*Primary Examiner* — Ibrahim Siddo
(74) *Attorney, Agent, or Firm* — Rossi, Kimms & McDowell LLP

(57) ABSTRACT

An image forming apparatus which is capable of canceling jobs upon a lapse of a predetermined time period depending on types of the jobs. Whether or not to cancel a job is determined with respect to each type of jobs. When occurrence of an error related to printing is detected during printing of a job, the job is suspended. When a time period of grace set in advance has elapsed since the job was suspended, the suspended job is canceled in a case where a setting to perform cancellation is made for a type of the suspended job.

15 Claims, 4 Drawing Sheets

FIG. 4

```
SETTING/REGISTRATION
```

401 — <AUTOMATIC CANCELLATION OF SUSPENDED JOB>
ON    OFF

402 — TIME TO AUTOMATIC CANCELLATION
5 MINUTES  −  +

403 — SETTINGS FOR RESPECTIVE JOB TYPES
PDL PRINT  ON  OFF
FAX PRINT  ON  OFF
OTHERS     ON  OFF

CANCEL    OK

FIG. 5

| JOB NUMBER | JOB TYPE | JOB STATUS |
|---|---|---|
| 601 | PDL PRINT | SUSPENDED DUE TO ERROR |
| 602 | PDL PRINT | WAITING TO BE PRINTED |
| 603 | FAX PRINT | WAITING TO BE PRINTED |
| | | |
| | | |

IMAGE FORMING APPARATUS THAT CANCELS JOB UPON OCCURRENCE OF ERROR, AND CONTROL METHOD THEREFOR

BACKGROUND OF THE INVENTION

Field of the Invention

The present invention relates to an image forming apparatus that cancels a job upon occurrence of an error, and a control method therefor.

Description of the Related Art

Conventionally, in an office environment, a plurality of users submits print jobs to an image forming apparatus using printer drivers or the like from their respective host computers and causes the image forming apparatus to perform printing. To cope with a case where an image forming apparatus stops due to occurrence of an error such as a paper jam, there is a method in which a user manually fixes the error to resume a print job without turning off the power to the image forming apparatus. Another method in which an image forming apparatus automatically cancels a print job when an error occurs is disclosed in Japanese Patent No. 4,584,731.

The above conventional techniques, however, have problems because when a job is cancelled immediately upon occurrence of an error, the efficiency of a printing process decreases to bring about an increase in user workload. On the other hand, in an environment where a plurality of print jobs has been submitted when a printing process for a suspended job is resumed, if another person manually fixes an error, a job may be resumed upon a lapse of a long time to output printed matter. This presents a security problem that, against the intent of a person who submitted a job, a third party may see printed matter that is highly confidential.

To solve the problems of the conventional techniques described above, there has been proposed a technique to allow a user to arbitrarily set a time period that elapses before a job is cancelled after an error occurs, and automatically cancel a print job upon a lapse of the set time period.

Also, lately, some image forming apparatuses are equipped with a connecting interface to connect with a fax line and have a fax receiving function of printing received fax data. Further, some image forming apparatuses have what is called a fax memory receiving mode in which received data is not immediately printed upon receipt, but is temporarily stored on an HDD or a nonvolatile memory, and printing is performed after an instruction to perform printing is received from a user. When the fax memory receiving mode is enabled, printing is allowed to be performed later even if a print job is cancelled. However, when an image forming apparatus does not have the fax memory receiving mode or when the fax memory receiving mode is disabled, data received by fax is not stored when a print job is cancelled, and hence printing cannot be performed after that.

Therefore, cancellation across the board may not be appropriate for some types of jobs. Specifically, like some jobs such as a facsimile job, a problem may occur irrespective of whether or not it is automatically cancelled. On the other hand, some jobs such as a job submitted from a host computer are dealt with by re-submission or the like in ordinary cases even after they are cancelled because a user notices the cancellation within a short period of time.

SUMMARY OF THE INVENTION

The present invention provides an image forming apparatus which is capable of canceling jobs upon a lapse of a predetermined time period depending on types of the jobs, and a control method therefor.

Accordingly, the present invention provides an image forming apparatus comprising a first setting unit configured to set whether to cancel a job with respect to each of predetermined types of jobs, wherein the first setting unit is capable of making a setting to cancel a job with respect to one of the predetermined types of jobs but not to cancel a job with respect to another of the predetermined types of jobs, a second setting unit configured to set a time period of grace, a detecting unit configured to detect occurrence of an error related to printing, a suspending unit configured to, based on the detection of occurrence of the error, suspend the job, and a cancellation unit configured to, on a condition that a time period of grace set by the second setting unit has elapsed since the job was suspended by the suspending unit, cancel the suspended job in a case where a setting to perform cancellation is made for a type of the suspended job by the first setting unit.

According to the present invention, jobs are cancelled upon a lapse of a predetermined time period depending on types of the jobs.

Further features of the present invention will become apparent from the following description of exemplary embodiments (with reference to the attached drawings).

BRIEF DESCRIPTION OF THE DRAWINGS

FIG. 4 is a view showing an exemplary automatic cancellation setting screen for a suspended job.

FIG. 5 is view showing an exemplary job list.

DESCRIPTION OF THE EMBODIMENTS

Hereafter, an embodiment of the present invention will be described with reference to the drawings.

Figure 1:
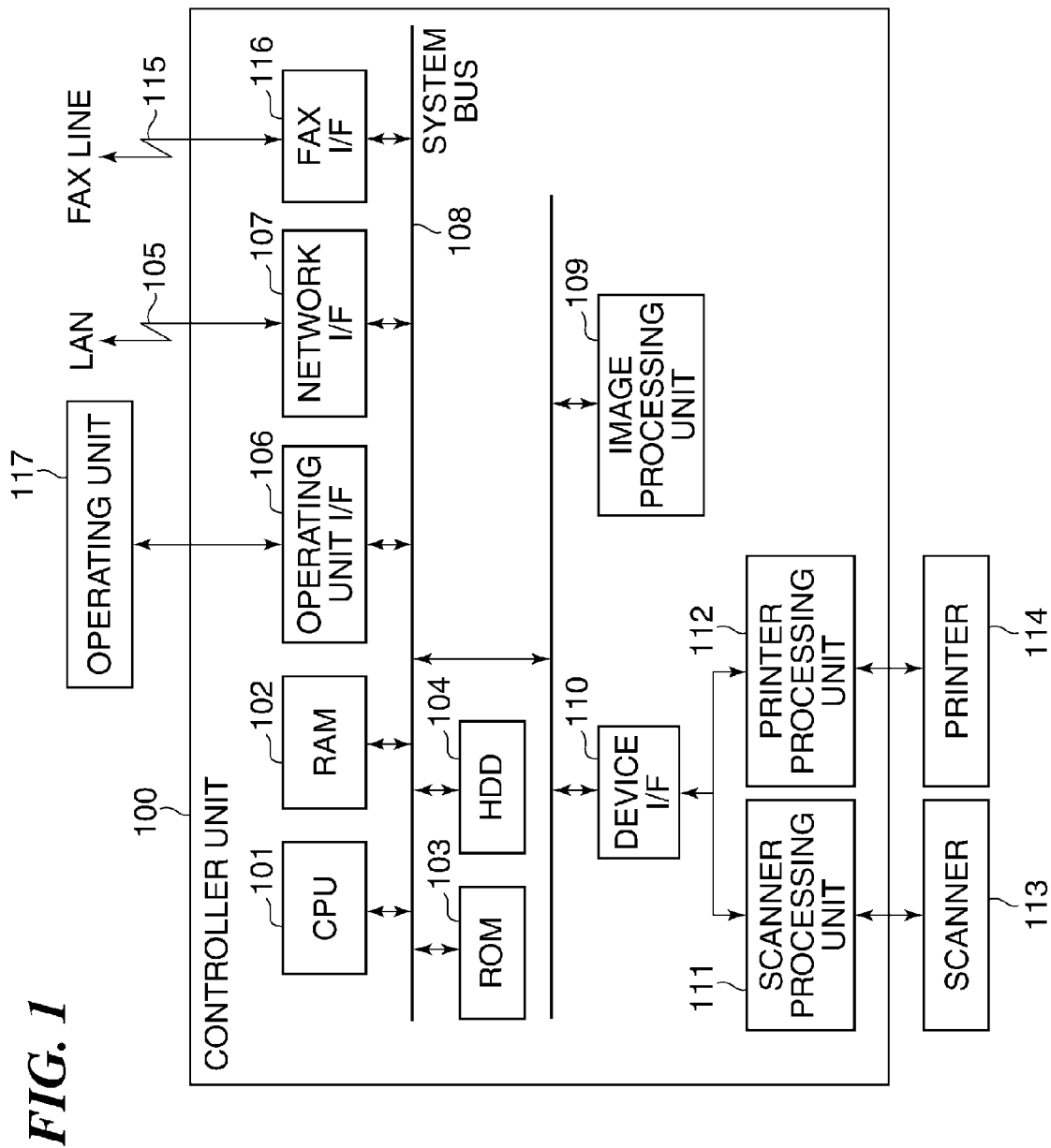
FIG. 1 is a block diagram schematically showing an overall arrangement of an image forming apparatus.

FIG. 1 is a block diagram schematically showing an overall arrangement of an image forming apparatus according to the embodiment of the present invention. This image forming apparatus has a controller unit 100 which controls the overall image forming apparatus, a scanner 113 which is an image input device, a printer 114 which is an image output device, and an operating unit 117 for use in receiving instructions from an operator and displaying information for the operator. The scanner 113, the printer 114, and the operating unit 117 are each connected to the controller unit 100 and controlled based on instructions from the controller unit 100. The scanner 113 is connected to a scanner processing unit 111 in the controller unit 100, and the printer unit 114 is connected to a printer processing unit 112 in the controller unit 100.

The controller unit 100 has a CPU 101. A RAM 102, a ROM 103, an HDD 104, an operating unit I/F 106, a network I/F 107, and a FAX I/F 116 are connected to the CPU 101 via a system bus 108. The RAM 103 is a memory that provides a work area for the CPU 101. The RAM 103 is used as a setting value storage memory for temporarily recording parameter settings and as an image memory for storing part of image data. The ROM 103, which is a boot ROM, stores a system boot program. System software, parameter setting value histories, image data, and so forth are stored in the HDD 104. The CPU 101 is brought to a state of readiness to execute controller programs by reading out the system boot program, which is stored in the ROM 103, into the RAM 103 and recording the same in the RAM 103.

The operating unit I/F 106 is an interface for input and output to and from the operating unit 117. In response to instructions from the CPU 101, the operating unit I/F 106 outputs image data to be displayed to the operating unit 117 and transmits information, which is input by the operator via the operating unit 117, to the CPU 101. The network I/F 107 is connected to a LAN 105 and inputs and outputs information to and from the LAN 105. An image processing unit 109 expands a PDL (page-description language) received from the LAN 105 into a bitmapped image. When image data is to be processed by the printer processing unit 112 and output by the printer 114, the image processing unit 109 performs image processing to convert the image data, which is stored in a compressed and encoded form in the HDD 104, into a format that can be handled by the printer processing unit 112. The device I/F 110, to which the scanner unit 113 and the printer 114 are connected via the scanner processing unit 111 and the printer processing unit 112, performs synchronous-to-asynchronous conversion of image data and transmits setting values, adjustment values, and device status data.

The scanner processing unit 111 subjects image data, which is received from the scanner 113, to a variety of processes such as edition, processing, image area separation, zooming, and editing such as binary coding. The scanner 113 has an automatic continuous original feeding device and a pressure plate reading device, each of which is not shown, and is able to read both sides of a plurality of originals. The scanner 113 also has a sensor, not shown, that detects opening or closing of an original cover and the presence or absence of an original, and detects a size of an original. Detected information and information on a status of the scanner 113 are sent to the CPU 101 via the scanner processing unit 111 and the device I/F 110. The printer processing unit 112 subjects image data, which is to be printed out, to processes such as correction and resolution conversion appropriate to the printer 114 and processes such as adjustment of the position at which an image is printed. The printer 114 has at least one sheet-feeding cassette (not shown) for storing sheets which are subjected to printing. Information on the residual amount of sheets in each sheet-feeding cassette, the presence or absence of toner, and so on is sent to the CPU 101 via the printer processing unit 112 and the device I/F 110. The FAX I/F 110 is connected to a fax line 115 and inputs and outputs information to and from the fax line 115.

Figure 2:
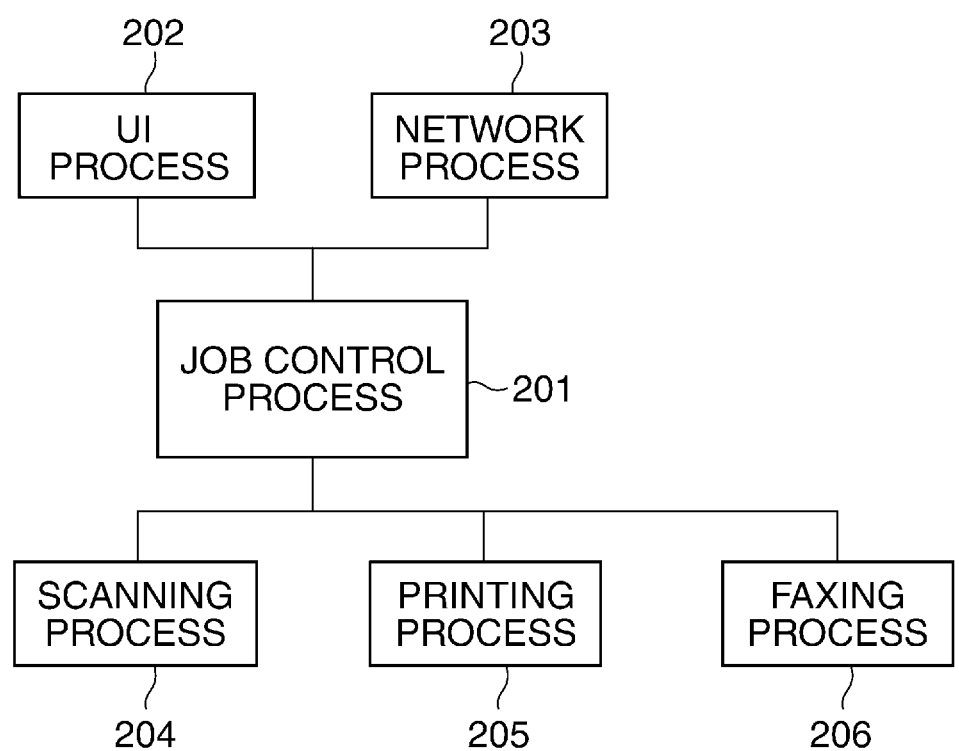
FIG. 2 is a configuration diagram showing software modules of the image forming apparatus.

FIG. 2 is a configuration diagram showing software modules of the image forming apparatus. The software modules shown in this figure run mainly on the CPU 101. Specifically, the software modules are implemented by the CPU 101 executing programs stored in the HDD 104 and read into the RAM 102. A job control process 201 controls the software modules (including those not shown in the figure) and controls all types of jobs generated within the image forming apparatus such as copying, printing, scanning, and UI (user interface) processes. A UI process 202 provides control related mainly to the operating unit 117 and the operating unit I/F 106. The UI process 202 notifies the job control process 201 of operation on the operating unit 117 by the operator. Also, based on instructions from the job control process 201, the UI process 202 controls what is displayed on a display screen on the operating unit 117 and controls edition of drawing data that is to be display on the operating unit 117.

A network process 203 is a module that controls communications with external apparatuses carried out mainly via the network I/F 107 and controls communications with devices on the LAN 105. Upon receiving control commands and data from the devices on the LAN 105, the network process 203 notifies the job control process 201 of their contents. Also, based on instructions from the job control process 201, the network process 203 transmits control commands and data to the devices on the LAN 105. Based on instructions from the job control process 201, a scanning process 204 controls the scanner 113 and the scanner processing unit 111 and issues an instruction to read an original on the scanner 113. The scanning process 204 then instructs the scanner processing unit 111 to perform image processing on an image read off the original. The scanning process 204 also obtains status information on statuses of the scanner 113 and the scanner processing unit 111 and notifies the job control process 201 of the statuses.

Based on instructions from the job control process 201, a printing process 205 controls the image processing unit 109, the printer processing unit 112, and the printer 114 an carries out a printing process for designated image processing. The printing process 205 receives information such as image data, image information (size of image data, color mode, resolution, and so forth), layout information (offset, enlargement/reduction, imposition, and so forth), and output sheet information (sheet size and orientation). The printing process 205 then controls the image processing unit 109 and the printer processing unit 112 to perform appropriate image processing on the image data and causes the printer processing unit 112 and the printer 114 to perform printing on a printing sheet. The printing process 205 also obtains information on statuses of the printer processing unit 112 and the printer 114 and notifies the job control process 201 of the statuses.

A faxing process 206 is a module that controls communications with external apparatuses carried out mainly via the fax I/F 116 and controls communications with devices on the fax line 115. Upon receiving fax data from the devices on the fax line 115, the faxing process 206 sends the fax data to the job control process 201. Also, based on instructions from the job control process 201, the faxing process 206 transmits fax data to the fax line 115.

Figure 3:
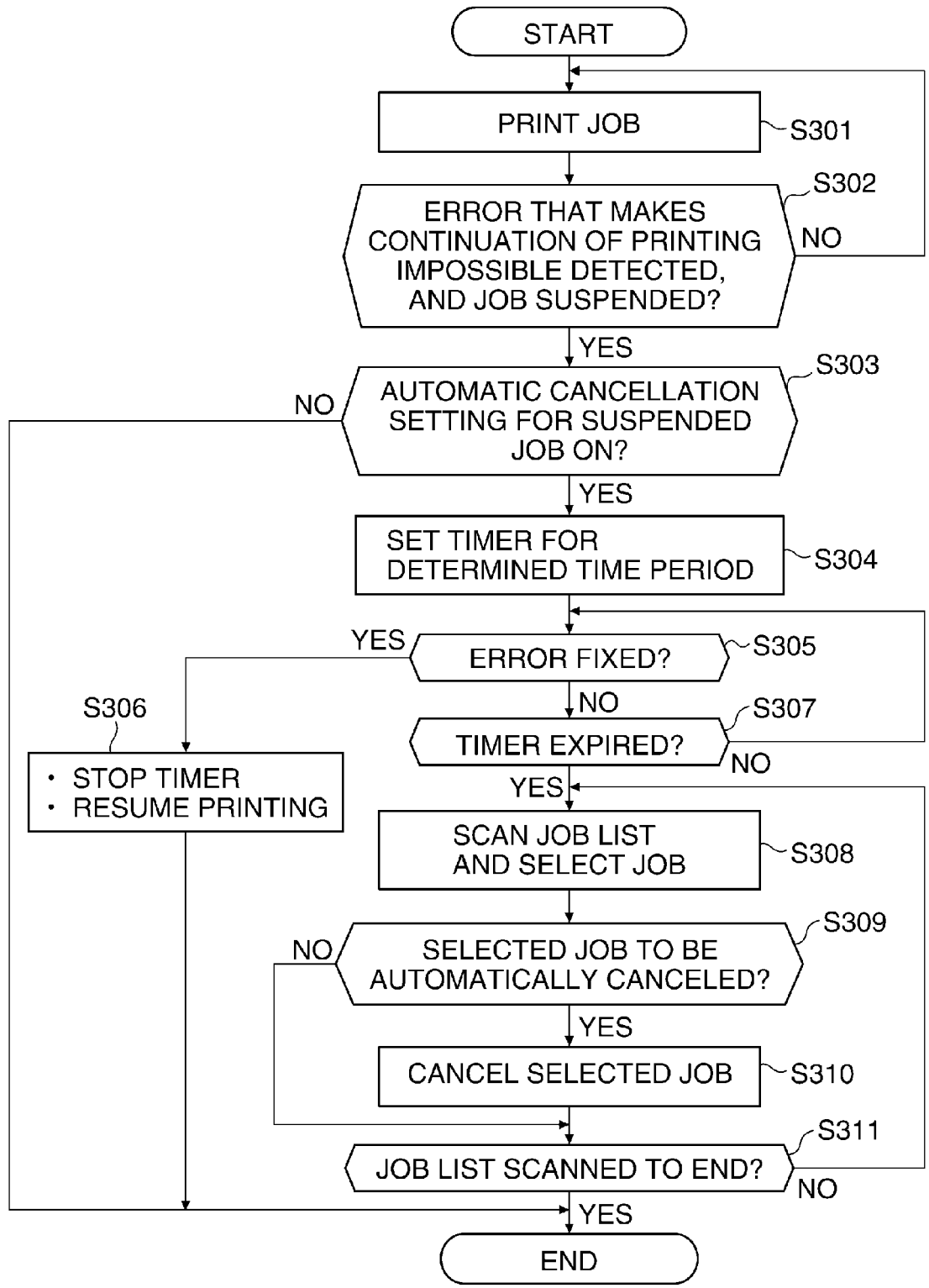
FIG. 3 is a flowchart of a job process.

FIG. 3 is a flowchart of a job process. This process is implemented by the CPU 101 executing programs stored in the HDD 104 and read into the RAM 102. This process is started in response to submission of a job.

The CPU 101 accepts a job by causing the UI process 202 to receive a job executing instruction from a user and requesting the printing process 205 to carry out the job executing instruction via the job control process 201. Alternatively, the CPU 101 causes the network process 203 to receive printing information supplied from an external computer, not shown, via the LAN 105 and the network I/F 107. Then, the CPU 101 accepts a job by causing the job control process 201 to make a request to the printing process 205 based on the information received by the network process 203. Upon accepting a job, the CPU 101 starts printing on the job (step S301). Received jobs are registered in a job list (see FIG. 5), which is stored in the RAM 102, in the order in which they were received, start to be printed in the order in which they were registered, and deleted from the job list upon completion of printing.

Next, in step S302, the CPU 101 detects occurrence of such an error as to make it impossible to continue printing a job and also determines whether or not a job being currently printed has been suspended during execution of printing due to occurrence of the error. Specifically, first, the CPU 101 receives error information supplied from the printer 114 via the printer processing unit 112 and the device I/F 110. Here, the CPU 101 corresponds to a detection unit of the present invention.

The error information supplied from the printer 114 includes an error factor such as paper-out when sheets in a sheet-feeding cassette, not shown, have run out, toner-out when toner has run out, or occurrence of a paper jam when a sheet jam has occurred. Notification that a paper jam has occurred is provided based on a signal from a conveyance sensor (not shown) placed on a sheet conveying path. When the CPU 101 receives the error information, the printing process 205 sends the error information to the job control process 201 in response to notification from the CPU 101. Then, the job control process 201 issues a stop request to the printing process 205. As a result, the job is suspended. The job control process 201 sends the error information received from the printing process 205 to the UI process 202. Then, the UI process 202 cause the operating unit 117 to display an error screen suitable for the error information. The job control process 201 acts as a suspending unit of the present invention.

Then, in step S303, the printing process 205 determines whether or not an automatic cancellation setting for a suspended job is on.

FIG. 4 is a view showing an exemplary setting screen for configuring an automatic cancellation setting for a suspended job. This setting screen is displayed on the operating unit 117 in accordance with an instruction from the user at an arbitrary time and controlled by the UI process 202 in accordance with an instruction from the job control process 201. In an on-off setting field 401, whether or not to automatically cancel a suspended job (ON/OFF) is set. In a time setting field 402, a time period of grace from when a job is suspended to when automatic cancellation is performed is set. In a cancelled job type setting field 403, whether or not to perform automatic cancellation (ON/OFF) is set with respect to each of job types.

Here, examples of the job types include PDL printing and fax printing. "PDL printing" is a print job in which a printing process is carried out on print data supplied from an external computer, not shown, via the LAN 105 and the network I/F 107. "Fax printing" is a print job in which a printing process is carried out on fax data received from the fax line 115 via the fax I/F 116. "Others" are print jobs other than PDL printing and fax printing. The job types are not limited to these examples. Depressing an OK button on the setting screen in FIG. 4 accepts the automatic cancellation setting, and setting information on the automatic cancellation setting is stored in the HDD 104 or a nonvolatile memory, not shown. In configuring the automatic cancellation setting, the job control process 201 acts as a first setting unit and a second setting unit of the present invasion.

As a result of the determination in the step S303, when the automatic cancellation setting for a suspended job is OFF, the printing process 205 ends the process in FIG. 3 because there is no need to perform automatic cancellation. On the other hand, as a result of the determination in the step S303, when the automatic cancellation setting for a suspended job is ON, the printing process 205 sets a timer for the time period of grace set in the time setting field 402 (FIG. 4) and causes the timer to start measuring elapsed time (step S304).

Then, in step S305, the CPU 101 determines whether or not the error that occurred has been fixed. Specifically, first, the CPU 101 receives an error recovery from the printer 114 via the printer processing unit 112 and the device I/F 110.

Next, in response to notification from the CPU 101, the printing process 205 carries out an error fixing process. Upon receiving notification of error recovery from the printing process 205, the CPU 101 determines that the error has been fixed. As a result of the determination in the step S305, the error has not been fixed, the printing process 205 determines whether or not the timer has expired (step S307). When the timer has not expired, the process returns to the step S305 in which the printing process 205 in turn keeps the job suspended and waits until the error is fixed. When the error is fixed before the timer expires, the process proceeds to step S306. When the timer expires without the error being fixed, the process proceeds to step S308.

In the step S306, the printing process 205 resets the timer and notifies the job control process 201 that the error has been fixed. The job control process 201 notified that the error has been fixed notifies the UI process 202 to that effect. Then, the UI process 202 deletes the error screen that has been displayed on the operating unit 117. The job control process 201 also instructs the printing process 205 to resume printing of the suspended job. After that, the process in FIG. 3 is brought to an end.

In the step S308, the printing process 205 notifies the job control process 201 that the time period of grace has elapsed, and the job control process 201 notifies to that effect scans a list of jobs, which have been received so far, from the first one and selects a job. Here, jobs are selected from the job list in the order in which they were received. Then, in step S309, the job control process 201 determines whether or not the job selected this time in the step S308 is a job to be automatically canceled. Specifically, the job control process 201 reads setting information on the automatic cancellation setting and determines whether or not a setting value set in the cancelled job type setting field 403 (FIG. 4) is ON for a type of the job selected this time.

When the job control process 201 determines that the job selected this time is not a job to be automatically canceled (the setting value is OFF), the process proceeds to step S311. On the other hand, when the job selected this time is a job to be automatically canceled, the job control process 201 performs cancellation of the selected job (step S310), followed by the process proceeding to the step S311. The job control process 201 acts as a cancellation unit of the present invention.

In the step S311, the job control process 201 determines whether or not the job list has been scanned up to the end. When the job control process 201 determines that the job list has not been scanned up to the end, the process returns to the step S308, in which the job control process 201 in turn selects a next job and carries out the processes in the step S309 and the subsequent steps. On the other hand, when the job list has been scanned up to the end, the process in FIG. 3 is brought to an end. Thus, among subsequent jobs received after the suspended job, those selected for automatic cancellation are automatically cancelled. When there are any subsequent jobs remaining in the job list without being cancelled, printing of those jobs is successively started in the step S301.

FIG. 5 is view showing an exemplary job list stored in the RAM 102. In this job list, unfinished jobs are registered in the order in which they were submitted. A job number, a job type, and a job status are recorded with respect to each job, and when the job status indicates an end status, the job is unregistered from the job list. The example shown in FIG. 5 shows that a first job with a job number 601 is in a suspended state because of an error, and subsequent jobs with job numbers 602 and 603 are in a state of waiting to be printed, that is, a state of being on a waiting list for printing.

According to the present embodiment, when an error occurs during printing of a job, the job is suspended, and when a time period of grace has elapsed since the job was suspended, the suspended job is automatically canceled in a case where the automatic cancellation setting for a type of the suspended job is on. As for each of subsequent jobs received after the suspended job, cancellation is performed for jobs of types that are selected to be cancelled. Jobs of types that are not selected to be cancelled are not cancelled. Whether or not to automatically cancel a job is allowed to be set for each type of jobs, and hence depending on a type, automatic cancellation upon a lapse of a time period of grace is performed with respect to each type of jobs.

Therefore, a form explained hereafter is preferable. For example, when a PDL job is canceled, a user himself or herself notices this and is able to deal with this, and hence PDL jobs are selected to be automatically canceled. On the other hand, in an environment where a fax cannot be received in memory, when a facsimile job in which data received by facsimile is printed is automatically canceled, the received data cannot be held, and after that, printing cannot be performed. Thus, facsimile jobs are not selected to be automatically canceled when printing is desired to be reliably performed. However, even facsimile jobs are automatically canceled when they are highly confidential. Thus, jobs are not automatically canceled across the board, but whether or not to automatically cancel a job is arbitrarily determined depending on a type of the job. For example, whether to give high priority to ensuring of security or prevention of loss of important documents is selectable according to a user environment.

Moreover, when an error is fixed before a time period of grace has elapsed since a job was suspended, the suspended job is resumed, and thus the job is quickly resumed by fixing of the error.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-196781, filed Oct. 2, 2015 which is hereby incorporated by reference herein in its entirety.

What is claimed is:

1. An image forming apparatus for executing a plurality of predetermined types of print jobs, including a first type of print job and a second type of print job, the image forming apparatus comprising:
a memory; and
a processor configured to implement instructions stored in the memory and execute:
a first setting task that sets, in accordance with an instruction from a user, a predetermined cancellation setting for a suspended job to either on or off with respect to each of the plurality of predetermined types of print jobs;
a second setting task that sets a grace time period;
a detecting task that detects an occurrence of an error related to printing;
a suspending task that, based on the detection of the occurrence of the error, suspends a print job being currently executed; and
a cancellation task that, when the grace time period set by the second setting task has elapsed since the suspending task suspended the print job, cancels the suspended print job in a case where the print job is the first type but does not cancel the suspended print job in a case where the print job is the second type,
wherein the first setting task sets, in accordance with the instruction from the user, the predetermined cancellation setting to on with respect to the first type of print job but sets the predetermined cancellation setting to off with respect to the second type of print job.

2. The image forming apparatus according to claim 1, wherein when the grace time period set by the second setting task has elapsed since the print job was suspended by the suspending task, the cancellation task does not cancel the suspended print job in a case where a setting to perform cancellation is not made for the type of the suspended print job by the first setting task.

3. The image forming apparatus according to claim 1, wherein when the grace time period set by the second setting task has elapsed since the print job was suspended by the suspending task, the cancellation task also cancels each of subsequent first type of print jobs received after the suspended print job.

4. The image forming apparatus according to claim 1, wherein when the detecting task detects fixing of the error before the grace time period set by the second setting task has elapsed since the print job was suspended by the suspending task, the suspended print job is resumed.

5. The image forming apparatus according to claim 1, wherein the types of print jobs include a print job in which data received by facsimile is printed.

6. The image forming apparatus according to claim 1, wherein the types of print jobs include a print job in which data received via a network is printed.

7. The image forming apparatus according to claim 1, wherein factors responsible for the error include at least one of the following: paper-out, toner-out, and occurrence of a paper jam.

8. The image forming apparatus according to claim 1, wherein the first type of print job is a PDL printing job and the second type of print job is a facsimile printing job.

9. The image forming apparatus according to claim 1, wherein, when the grace time period set by the second setting task has elapsed since the suspending task suspended the print job, the cancellation task cancels the suspended print job which is either one of the first type or the second type in a case where the first setting task has set, in accordance with the instruction from the user, the predetermined cancellation setting to on with respect to both of the first and second types of print jobs.

10. The image forming apparatus according to claim 1, wherein the plurality of predetermined types of print jobs further include a copy job as a third type of print job.

11. The image forming apparatus according to claim 1, wherein the second setting task sets the grace time period according to a user instruction.

12. An image forming apparatus for executing a print job of a first type and a print job of a second type, the image forming apparatus comprising:
a memory; and
a processor configured to implement instructions stored in the memory and execute:
a setting task that sets, for the print job of each of the first type and the second type, whether to enable or disable a function to cancel the print job based on a suspension of the print job for a predetermined time period due to an occurrence of an error related to printing, in accordance with an instruction from a user; and
a determination task that determines, based on the setting made by the setting task and a type of a print job that has been suspended for the predetermined time period due to the occurrence of the error, whether to cancel the suspended print job,
wherein, in a first case where the function is enabled for the print job of first type and the function is disabled for the print job of second type by the setting task, the determination task determines to cancel the suspended print job in a case where the suspended print job is the first type and not cancel the suspended print job in a case where the suspended print job is the second type, and
wherein, in a first case where the function is disabled for the print job of first type and the function is enabled for the print job of second type by the setting task, the determination task determines not to cancel the suspended print job in a case where the suspended print job is the first type and cancel the suspended print job in a case where the suspended print job is the second type.

13. The image forming apparatus according to claim 12, wherein the first type print job is a PDL printing job and the second type print job is a FAX printing job.

14. A control method for an image forming apparatus for executing a plurality of predetermined types of print jobs, including a first type of print job and a second type of print job, the control method, comprising:
a first setting step of setting, in accordance with an instruction from a user, a predetermined cancellation setting for a suspended job to either on or off with respect to each of the plurality of predetermined types of print jobs;
a second setting step of setting a grace time period;
a detecting step of detecting an occurrence of an error related to printing;
a suspending step of, based on the detection of the occurrence of the error, suspending the print job being currently executed; and
a cancellation step of, when the grace time period set in the second setting step has elapsed since the suspending step suspended the print job, cancelling the suspended print job in a case where the print job is the first type but not canceling the suspended print job in a case where the print job is the second type,
wherein the first setting step sets, in accordance with the instruction from the user, the predetermined cancellation setting to on with respect to the first type of print job but sets the predetermined cancellation setting to off with respect to the second type of print job.

15. A control method for an image forming apparatus for executing a print job of a first type and a print job of a second type, the control method comprising:
a setting step of setting, for the print job of each of the first type and the second type, whether to enable or disable a function to cancel the print job based on a suspension of the print job for a predetermined time period due to an occurrence of an error related to printing, in accordance with an instruction from a user; and
a determination step of determining, based on the setting of the function and a type of the print job having been suspended for the predetermined time period due to the occurrence of the error, whether to cancel the suspended print job,
wherein, in a first case where the function is enabled for the first type job and the function is disabled for the second type job by the setting, it is determined to cancel the suspended print job in a case where the suspended print job is the first type and not to cancel the suspended print job in a case where the suspended print job is the second type, and
wherein, in a second case where the function is disabled for the first type job and the function is enabled for the second type job by the setting, it is determined not to cancel the suspended print job which is the first type and to cancel the suspended print job which is the second type.

* * * * *